United States Patent [19]

Aronne

[11] Patent Number: 5,425,517

[45] Date of Patent: Jun. 20, 1995

[54] STRAP ADJUSTING DEVICE

[75] Inventor: Armand J. Aronne, Massapequa, N.Y.

[73] Assignee: Grumman Aerospace Corporation, Bethpage, N.Y.

[21] Appl. No.: 217,966

[22] Filed: Mar. 25, 1994

[51] Int. Cl.⁶ .................... B64D 25/06; A62B 35/00
[52] U.S. Cl. ............................ 244/122 B; 242/379
[58] Field of Search ........ 244/122 B, 151 R, 122 AG; 242/107, 107.1, 107.11, 107.6, 378.3, 379

[56] References Cited

U.S. PATENT DOCUMENTS

| | | | |
|---|---|---|---|
| 3,319,907 | 5/1967 | McAninch et al. | 242/107.11 |
| 3,421,711 | 1/1969 | Brow et al. | 242/107.11 |
| 3,425,646 | 2/1969 | Hollowell | 242/107.11 |
| 3,465,983 | 9/1969 | Taggart | 242/107.11 |

Primary Examiner—William Grant
Attorney, Agent, or Firm—Scully, Scott, Murphy & Presser

[57] ABSTRACT

A strap adjusting device for a harness-adjustment strap having a length, a first end affixed to an aircraft seat-mounted harness and a spaced opposite second end which is free. A wind up device removably affixed to the strap at the second end. The wind up device automatically winds up the strap for a determined length from the second end. The determined length of the strap is thus compacted and restrained from hanging loose. The wind up device includes a housing and a spring in the housing for winding up the strap. A clamp releasably clamps the second end of the strap to the spring.

6 Claims, 2 Drawing Sheets

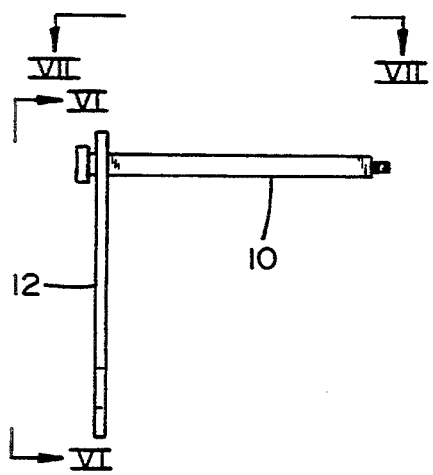
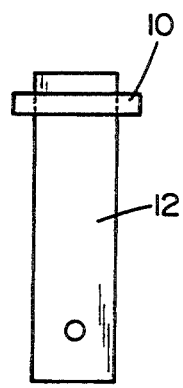
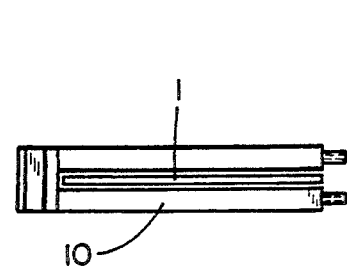
FIG.5  FIG.6  FIG.7
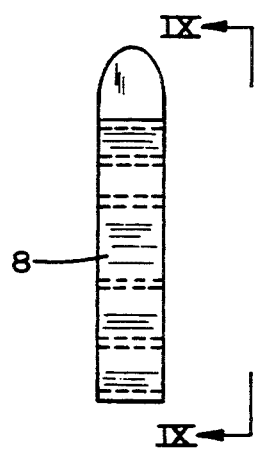
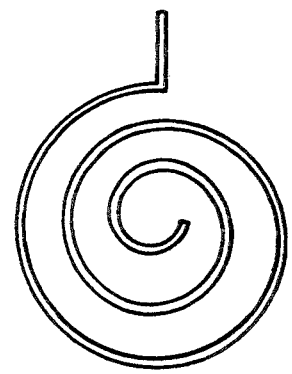
FIG.8  FIG.9
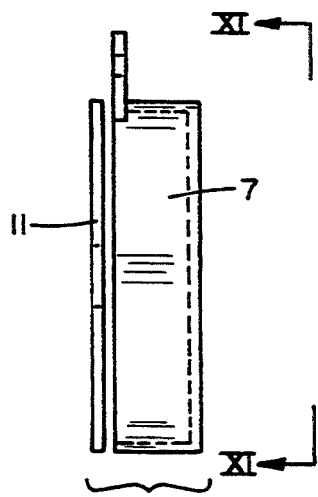
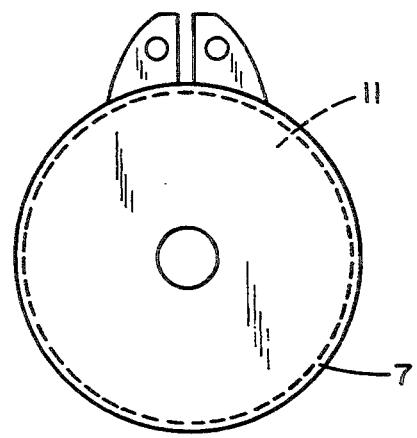
FIG.10  FIG.11

STRAP ADJUSTING DEVICE

BACKGROUND OF THE INVENTION

1. Field of the Invention

The present invention relates to a strap adjusting device. More particularly, the invention relates to a strap adjusting device for an aircraft harness-adjustment strap.

2. Prior Art

The Air Force pilot or airman's restraint system has been a structural vest put on before entering the cockpit. The Air Force vest was available in three sizes. The Navy restraint system has also been a structural vest put on by a pilot or airman before entering the cockpit. The Navy vest was available in 22 sizes.

As an economy measure, the Air Force and Navy now desire a seat-mounted harness. This would result in one harness per seat, rather than the approximately 2½ structural harnesses per flyer there have been. There has also been a great flying weight spread and the largest size accommodation ever invoked (from the smallest to the largest flyer).

The problem created by the size accommodation is that the adjustment straps on the seat-mounted harness are sized for big people. When a small person utilizes the harness and adjusts it, two or three feet of strap hang loose from the adjustment buckle of the harness. This is the case with at least four adjustment straps of the harness, so the problem is greatly compounded by several feet of several straps hanging loose and being potentially dangerous due to their accident-causing potential.

The principal object of the invention is to provide a strap adjusting device of simple structure, which functions efficiently, effectively and reliably to eliminate loose hanging straps.

An object of the invention is to provide a strap adjusting device which is inexpensive in manufacture and used with facility, convenience and rapidity to eliminate loose hanging straps.

Another object of the invention is to provide a strap adjusting device of simple structure, which is inexpensive in manufacture and used with facility, convenience and rapidity to eliminate loose hanging straps from an aircraft seat-mounted harness.

BRIEF SUMMARY OF THE INVENTION

In accordance with the invention, a strap adjusting device for a strap having a length and first and second spaced opposite ends, the first end being affixed to an object and the second end being free, comprises wind up means affixed to the strap at the second end for automatically winding up the strap for a determined length from the second end. Thus, the determined length of the strap is substantially compacted and restrained from hanging loose.

The object to which the first end is affixed is an aircraft seat-mounted harness and the strap is a harness-adjustment strap. The wind up means is removably affixed to the strap. The wind up means includes a spring for winding up the strap. A clamp releasably clamps the second end of the strap to the spring. The spring is in a housing.

In accordance with the invention, a strap adjusting device for a harness-adjustment strap having a length, a first end affixed to an aircraft seat-mounted harness and a spaced opposite second end which is free, comprises wind up means removably affixed to the strap at the second end for automatically winding up the strap for a determined length from the second end. The determined length of the strap is thereby substantially compacted and restrained from hanging loose.

BRIEF DESCRIPTION OF THE DRAWINGS

Other objects and features of the present invention will become apparent from the following detailed description considered in connection with the accompanying drawings which disclose an embodiment of the present invention. It should be understood, however, that the drawings are designed for the purpose of illustration only and not as a definition of the limits of the invention.

In the drawings, wherein similar reference characters denote similar elements throughout the several views:

FIG. 5 is a view of the strap guide of the embodiment of FIGS. 1 and 2;

FIG. 6 is an axial view, taken along the lines VI—VI of FIG. 5;

FIG. 7 is a top view, taken along the lines VII—VII of FIG. 5;

FIG. 8 is a view of the spring of the embodiment of FIGS. 1 and 2;

FIG. 9 is an axial view, taken along the lines IX—IX of FIG. 8;

FIG. 10 is a view of the housing of the embodiment of FIGS. 1 and 2; and

FIG. 11 is an axial view, taken along the lines XI—XI of FIG. 10.

DETAILED DESCRIPTION OF PREFERRED EMBODIMENTS

Figure 4:
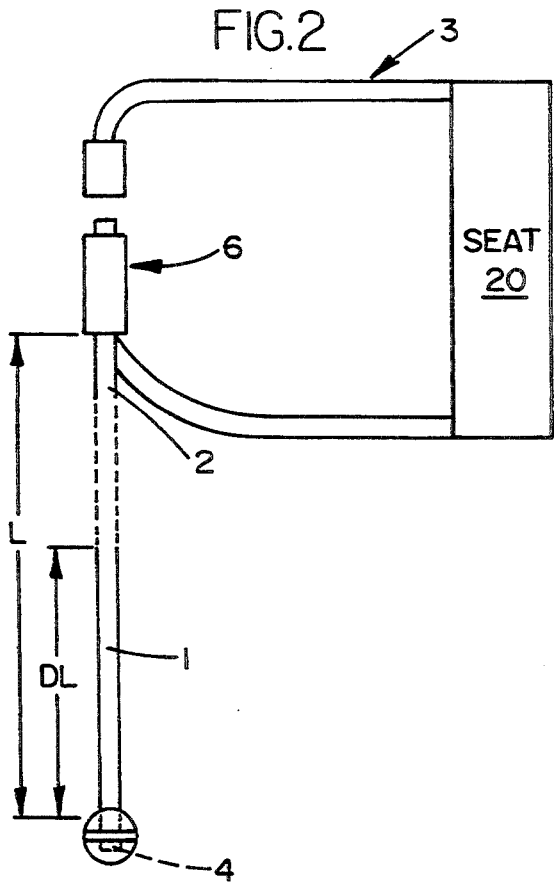
FIG. 4 is an axial view, taken along lines IV—IV of FIG. 3.

The strap adjusting device of the invention, shown in FIGS. 1 to 11, is for a harness-adjustment strap 1 (FIGS. 1 to 4 and 7) having a length L (FIG. 4). Strap 1 has a first end 2 affixed to a harness 3 of an aircraft seat 20 and a spaced opposite second end 4 which is free, as shown in FIGS. 1 to 4.

In accordance with the invention, a wind up device 5 is removably affixed to the strap 1 at the second end 4 for automatically winding up said strap for a determined length DL from said second end. The determined length DL is that from the adjustment buckle 6 of the harness 3 to the second end 4. This results in the compacting, or rolling, and restraining of strap 1 from hanging loose, shown in FIGS. 2.

Figure 1:
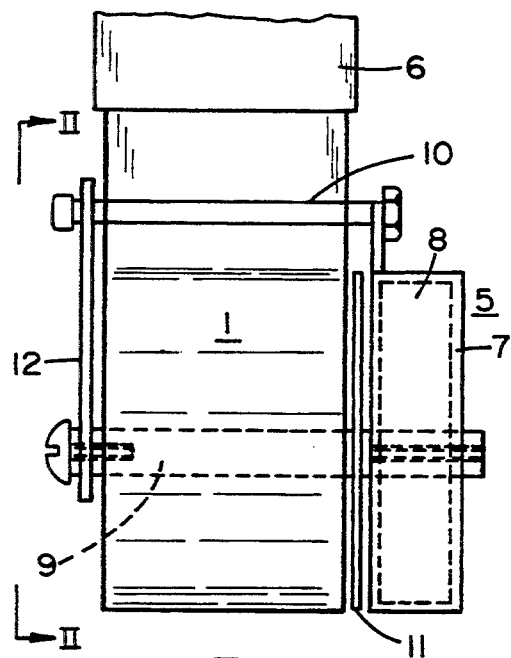
FIG. 1 is a view of an embodiment of the strap adjusting device of the invention.
Figure 2:
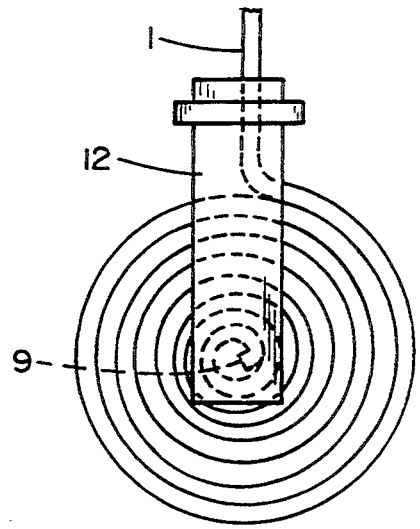
FIG. 2 is an axial view, taken along the line II—II of FIG. 1.
Figure 3:
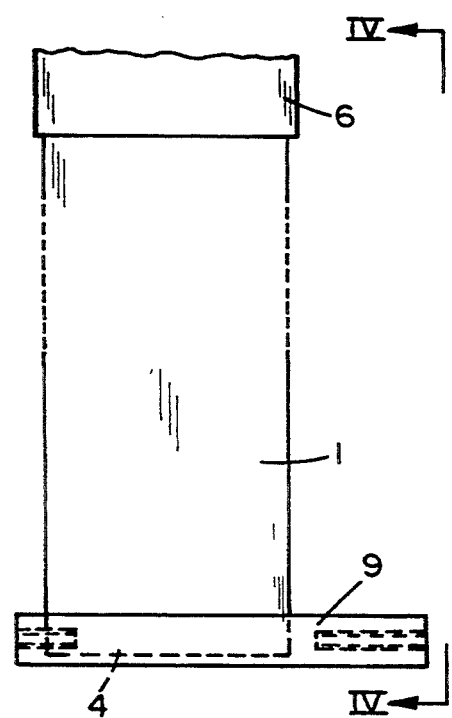
FIG. 3 is a view of the end of the strap and its molded end.

The wind up device 5 has a housing 7 (FIGS. 1, 10 and 11). A torsion spring 8 of any suitable known type (FIGS. 1, 8 and 9) in the housing, as shown in FIG. 1, for winding up the strap 1. A clamp 9 of any suitable known type (FIGS. 1 to 4) releasably clamps the second end 4 of strap 1 to spring 8 in housing 7.

A strap guide 10 of any suitable known type (FIGS. 1, 2 and 5 to 7) guides the strap 1 into the housing 7 without twisting. A disc 11 (FIGS. 1, 10 and 11) functions as a cover for the housing 7 and retains spring 8 in said housing.

The strap adjusting device of the invention is used by clamping or epoxying or nylon molding into clamp 9 which could be nylon, the free second end 4 of strap 1 (FIGS. 1 to 4). Strap 1 is also placed in a strap guide 10 close to the housing 7, since said strap guide is mounted on an arm 12 (FIGS. 1, 5 and 6) which pivotally affixes said strap guide to clamp 9. The arm 12 is shorter than the diameter of the housing 7. Spring 8 then winds up strap 1.

If harness 3 is to be used for a bigger person, the strap 1 is removed from clamp 9.

While only a single embodiment of the present invention has been shown and described, it is to be understood that many changes and modifications may be made thereunto without departing from the spirit and scope of the invention as defined in the appended claims.

What is claimed is:

1. A strap adjusting device for a harness adjustment strap having a length and first and second spaced opposite ends, said first end being affixed to an object and said second end being free, with an adjustment buckle being located between said first and second ends, said device comprising:
    a clamp connected to said second free end of said strap;
    wind up means affixed to said clamp and the strap at said second end for automatically winding up said strap for a determined length between said buckle and said second end;
    a strap guide for guiding the strap into the wind up means without twisting whereby the determined length of said strap is substantially compacted and restrained from hanging loose.

2. A device as claimed in claim 1, wherein the object to which said first end is affixed is an aircraft seat-mounted harness.

3. A device as claimed in claim 1, wherein said wind up means is removably affixed to said strap and includes a spring for winding up said strap.

4. A device as claimed in claim 3, wherein said wind up means further includes a housing for said spring.

5. A strap adjusting device for a harness-adjustment strap having a length, two sides, a first end affixed to an aircraft seat-mounted harness and a spaced opposite second end which is free, with an adjustment buckle being located between said first and second ends, said device comprising:
    wind up means removably affixed to the strap at said second end for automatically winding up said strap for a determined length between said buckle and said second end, said wind up means including:
    (i) a housing,
    (ii) a spring in said housing for winding up said strap,
    (iii) a nylon clamp for releasably connecting said second free end of said strap to said spring, and
    (iv) a strap guide coupled to said housing and having two spaced bars disposed on either side of the strap for guiding the strap into said housing without twisting;
    whereby the determined length of said strap is substantially compacted and restrained from hanging loose.

6. A device for compacting an adjustment strap, comprising in combination:
    an aircraft seat equipped with a seat-mounted harness including an adjustment buckle and an adjustment strap with a free end;
    a nylon clamp molded onto said free end of said strap;
    a wind-up device including a housing, a spring located within said housing, and a strap guide having two spaced parallel bars connected to said housing for guiding said strap into said housing without twisting;
    said free end of said strap passing between said bars of said strap guide with said clamp being demountably coupled to said spring, such that said wind-up device is between said buckle and said free end; and
    wherein said clamp is rotatable by said spring to roll said strap around said clamp so that said strap is compacted and restrained from hanging loose.

* * * * *